June 22, 1965  M. DIAMANT  3,190,436
PROTECTIVE SHEATH FOR CLINICAL THERMOMETERS
Filed June 25, 1963
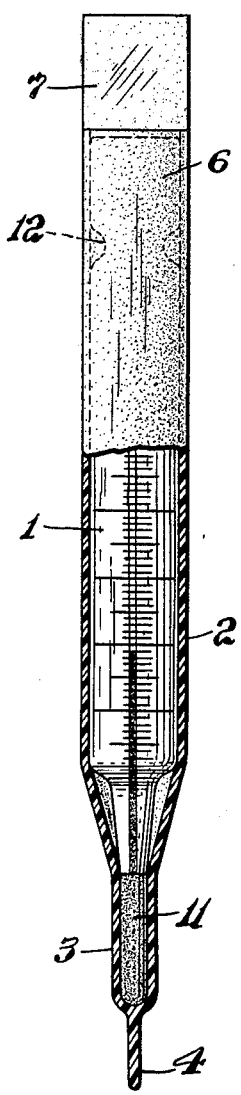
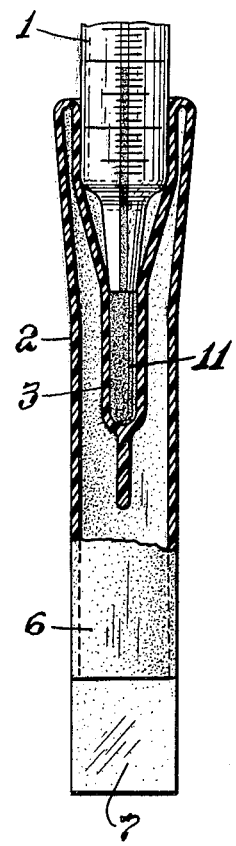
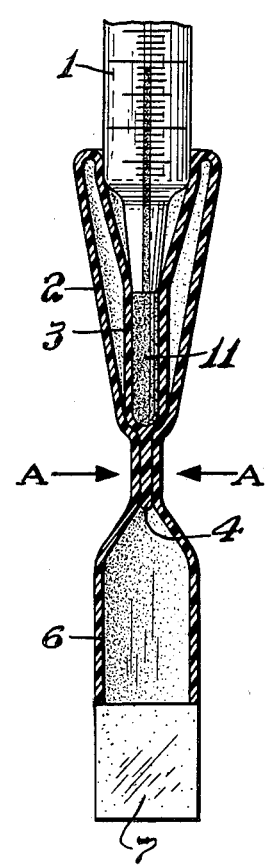
INVENTOR.
Marcus Diamant United States Patent Office 3,190,436
Patented June 22, 1965

3,190,436
PROTECTIVE SHEATH FOR CLINICAL
THERMOMETERS
Marcus Diamant, 1 Kungsgatan, Halmstad, Sweden
Filed June 25, 1963, Ser. No. 290,363
Claims priority, application Sweden, July 27, 1962,
8,287/62
8 Claims. (Cl. 206—16.5)

This invention relates to protective sheaths for clinical thermometers, and more particularly to an improvement of the type of thermometer sheath disclosed in my United States Patent No. 2,915,175.

In that patent, I disclosed an elongated tubular sheath of supple, preferably transparent material which has one open and one closed longitudinal end so that a thermometer may be inserted into the open end until its temperature-sensitive bulb engages the closed end in the interior of the tube. The sheathed thermometer bulb may be introduced into a body cavity for a temperature measurement without any direct contact of the thermometer with the body. After use, the thermometer is unsheathed by turning the sheath inside out so as to cover the portion of the sheath contaminated by contact with the body. The thermometer may then be removed, and the sheath may be discarded or sterilized for repeated use.

It is necessary that the closed end of the sheath closely conform to the thermometer bulb if the temperature reading is to be taken in the shortest possible time. The resilient engagement between the closed sheath end and the thermometer bulb is advantageous in permitting the sheath to be inverted by pulling the open terminal sheath portion toward the thermometer bulb while the other end portion of the thermometer, accessible through the open sheath end, is pulled in the opposite direction.

When the thermometer bulb is held very tightly in the closed sheath end, the withdrawal of the bulb from the sheath end in the last stage of the unsheathing operation requires relatively great force to be applied. I have found that very tightly fitting sheaths may be torn by such force. It is one of the advantages of sheathed thermometers according to my earlier patent that the hands of a nurse cannot be contaminated by body fluids of patients during use of a sheathed thermometer as long as the sheath remains intact. When it is torn during removal of the thermometer, its advantageous safety feature is lost.

The object of the instant invention is the provision of an improved thermometer sheath which is not apt to tear during removal from a thermometer.

Another object of the invention is the provision of a sheath for a clinical thermometer which can readily be removed without danger of contamination even when very tightly engaging the bulb of the thermometer.

With these and other objects in view, the invention in one of its aspects provides a projecting tab member on the closed end portion of the tubular sheath. The tab member is preferably flat, and normally extends in a plane parallel to the direction of elongation of the tubular portion of the sheath. It may consist of the same supple material as the sheath proper, and is preferably integral therewith.

Other features and the attendant advantages of this invention will be readily appreciated as the same becomes better understood by reference to the following detailed description when considered in connection with the accompanying drawings in which:

FIG. 1 shows an improved sheath of the invention with inserted thermometer in elevational, partly sectional view;
FIG. 2 shows the sheath and a portion of the thermometer of FIG. 1 during unsheathing of the thermometer; and
FIG. 3 is an elevational sectional view of the sheath and thermometer portion of FIG. 2 in the last stage of unsheathing.

Referring now to the drawing in detail, and initially to FIG. 1, there is shown a clinical thermometer 1 of the conventional type having a tubular glass shell. The lower end of the glass shell is of reduced cross section and forms a bulb 11 for mercury or like temperature-sensitive fluid, whereas the top of the shell has an external groove 12 for more secure gripping of the thermometer.

The thermometer is encased in a tubular sheath 2 of thin and practically transparent elastomeric plastic. The lower hollow end 3 of the sheath is tapered so that it tightly envelopes the bulb 11. An integral flat tab 4 extends further downward from the hollow end portion 3. It is integral with the remainder of the sheath, but of somewhat greater thickness.

The cavity in the sheath 2 is about as long as the thermometer 1 so that the thermometer is completely covered by the sheath. The top end 6 of the sheath is open, and another tab 7 similar to the tab 4 extends upward from the open sheath end 6. The plane of the tab 7 is perpendicular to that of the tab 4.

The protective sheath of the invention is used as follows:

Before taking a temperature measurement, the nurse slips a freshly sterilized sheath 2 over a thermometer 1, and inserts the lower sheath end 3 with the thermometer bulb 11 into a body cavity of the patient. The flexible tab 4 does not interfere with the insertion of the sheathed thermometer nor with the heat transfer from the patient's body to the bulb. The top end 6 of the sheath remains outside the body, and is thus safe from contamination by body fluids.

After the measurement is completed, and the temperature has been read, the thermometer 1 is removed from the sheath 2. Removal is initiated by pulling the tab 7 toward the bulb 11 while the latter is tightly gripped by the resilient lower sheath portion 3. As soon as the top of thermometer shell is exposed, it is being gripped, and the inversion of the sheath proceeds by pulling of the thermometer 1 and the tab 7 in opposite longitudinal directions. FIG. 2 shows the lower portion of the thermometer 1 emerging from the sheath 2.

When all but the tapering lower portion 3 of the sheath has been inverted, the resistance to further downward pulling of the tab 7 increases perceptibly. At this stage, all surfaces of the sheath which were in contact with the patient or exposed to his body fluids are safely kept out of reach of the nurse's hand by the inverted sheath portion, and only the uncontaminated sheath surface is accessible, as is seen in FIG. 3.

The pressure of two opposed fingers may now be applied as indicated by arrows A firmly to grip the tab 4, and the bulb 11 of the thermometer may be separated from the lower end portion 3 of the sheath by pulling the tab 4 and the thermometer 1 in opposite directions. The sheath is not further inverted in this last stage of the unsheathing operation, and no further inversion is necessary.

The pulling force applied is distributed between the tubular portion of the sheath 2 and the sturdy tab 4 so that rupture of the tubular wall is avoided.

In my earlier patent, I have disclosed the use of a thread internally attached to the bottom end of the sheath to facilitate the turning of the sheath during its removal from the thermometer, and it will be understood that such a thread may be employed in conjunction with the improved sheath of the instant invention.

A sheath equipped with a tab at its lower end may be used with thermometers of different bulb sizes, and more particularly with those having relatively large bulbs customary for measuring the temperature in the buccal cavity. The very tight engagement of the sheath with thermometers having bulbs of particularly great cross section does not adversely affect the safe removal of the sheath after use. Exposure of a contaminated sheath surface due to sheath rupture is avoided by proper manipulation of the improved sheath made possible by the tabs.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What I claim is:

1. A protective sheath for a clinical thermometer comprising, in combination:
    (a) an elongated tubular body of supple material having an open longitudinal end portion and a closed longitudinal end portion, said body defining a cavity therein, said cavity extending between said end portions and being adapted to receive said thermometer, and
    (b) a tab member fastened to said closed end portion and normally projecting therefrom.

2. A sheath as set forth in claim 1, wherein said tab member is flat and normally extends in a plane parallel to said direction.

3. A sheath as set forth in claim 2, wherein said tab member is integral with said tubular body.

4. A sheath as set forth in claim 1, further comprising tab means on said open end portion of said body, and extending therefrom in a direction away from said tab member.

5. A sheath as set forth in claim 4, wherein said tab means is flat and integral with said body.

6. A temperature measuring arrangement for clinical purposes comprising, in combination:
    (a) an elongated thermometer having a temperature-sensitive longitudinal end portion;
    (b) an elongated tubular body of supple material having a closed longitudinal end portion and an open longitudinal end portion and defining a cavity therein, said cavity extending between said end portions and receiving said thermometer; and
    (c) a tab member fastened to said closed end portion and normally projecting therefrom.

7. An arrangement as set forth in claim 6, further comprising tab means fastened to said open end portion, said tab member and said tab means projecting from the respective end portions in opposite longitudinal directions and being integral with said tubular body.

8. An arrangement as set forth in claim 6, wherein said end portion of said thermometer is resiliently engaged by said closed end portion of said body.

References Cited by the Examiner

UNITED STATES PATENTS

| | | | |
|---|---|---|---|
| 325,186 | 8/85 | Reichardt | 206—16.5 |
| 738,960 | 9/03 | Vaughan et al. | 206—16.5 |
| 2,969,141 | 1/61 | Katzin | 206—16.5 |

THERON E. CONDON, *Primary Examiner*.